Patented Nov. 9, 1948

2,453,562

UNITED STATES PATENT OFFICE 2,453,562

HEAT-CURABLE ELASTIC COMPOSITIONS OF MATTER

James G. E. Wright, Schenectady, N. Y., assignor to General Electric Company, a corporation of New York No Drawing. Application March 11, 1948, Serial No. 14,385

10 Claims. (Cl. 260—37)

The present invention relates to heat-curable, solid, elastic compositions of matter. More particularly, the invention is concerned with a composition of matter comprising a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, and having incorporated therein an amount of a zirconyl nitrate sufficient to effect curing of the elastic product.

In the pending application of Maynard C. Agens, Serial No. 526,473, filed March 14, 1944, now Patent No. 2,448,756, and assigned to the same assignee as the present invention, there are disclosed and claimed compositions of matter comprising solid, elastic, curable methylpolysiloxanes obtained by condensing a liquid comprising polymeric dimethylsiloxane containing up to 2 mol per cent, for example, from 0.05 to 1 mol per cent copolymerized monomethylsiloxane. These solid, elastic products may be compounded with various suitable fillers and thereafter subjected to heat and pressure to yield heat-cured compositions of matter having improved strengths. In order to accelerate the conversion of the solid, elastic products to a substantially insoluble, infusible though still elastic state, certain cure accelerators or vulcanizing agents may be added to the solid, elastic product or gum prior to subjecting it to the heat and pressure.

One of the few cure accelerators which has been found suitable for effecting the conversion of the heat-curable, solid, elastic product to the insoluble, infusible state is benzoyl peroxide. The use of this vulcanizing agent is more particularly disclosed and claimed in the pending application of Curtis S. Oliver and myself, Serial No. 526,472, filed March 14, 1944, now Patent No. 2,448,565, and assigned to the same assignee as the present invention. By means of the use of the benzoyl peroxide, improved cured silicone elastomers are obtained which are stronger and harder than it is possible to obtain where the cure accelerator is omitted. In addition, the speed with which this curing can be effected is markedly accelerated by the use of benzoyl peroxide.

Although the aforementioned cure accelerator, benzoyl peroxide, has found immediate and enthusiastic use as a vulcanizing agent for the solid, elastic, curable methylpolysiloxane, nevertheless, at very high temperatures of the order of from 200° to 300° C., cured, elastic products employing benzoyl peroxide as the vulcanizing agent suffer weight losses which under certain conditions of use might be detrimental. In addition, after long periods of use at temperature of the order of about 200° C., solid, elastic silicone rubbers vulcanized with benzoyl peroxide begin to exhibit some loss of flexibility. This is especially true when the solid, elastic silicone gum is filled with such fillers as, for example, celite (diatomaceous earth).

I have now discovered that I am able to decrease the weight loss and maintain the flexibility of cured, solid, elastic methylpolysiloxane over long periods of time at temperatures of 200° C. or higher by employing as a cure accelerator for the said solid, elastic product a zirconyl nitrate, either in the hydrous or anhydrous form, e. g., $3ZrO_2.2N_2O_5$, $ZrO_2.N_2O_5$, $ZrO(NO_3)_2.2H_2O$, $Zr_2O_3(NO_3)_2.5H_2O$, $Zr(NO_3)_4.5H_2O$, $ZrO(NO_3)_2.3H_2O$, $ZrO(NO_3)_2$, etc. Since one of the advantages of using solid, elastic methylpolysiloxanes in commercial applications is based on its outstanding thermal stability and heat resistance, it is apparent that any improvement in such properties will enhance and extend the use of such materials.

Although the amount of zirconyl nitrate employed is generally that required to effect curing of the solid, elastic methylpolysiloxane, I have found that good results are obtained by using this cure accelerator in amounts ranging from 0.1 to 6 per cent, by weight, based on the weight of the solid, elastic methylpolysiloxane. Marked increases in the tensile strength, hardness, elongation and heat resistance are obtained with amounts ranging from approximately 0.5 to 4 per cent, by weight, of the zirconyl nitrate based on the weight of the solid, elastic product.

Any of the heat-curable, solid, elastic methylpolysiloxane (methyl silicone gums) described in the aforementioned Agens application may be used in practicing the present invention. The solid, elastic products or gums prepared from liquid dimethylpolysiloxanes having a methyl-to-silicon ratio of from 1.98 to 2.00, preferably from 1.995 to 2.000, are preferred. As is more fully described in the pending Agens application and in the aforementioned application of Oliver and myself, these liquid methylpolysiloxanes may be prepared, for example, by the hydrolysis of a dimethyldihalogenosilane containing from 0 to 2 mol per cent monomethyltrihalogenosilane.

It will be apparent to those skilled in the art that other modifications of the solid, elastic product may be made during its preparation. Thus, intercondensed diphenylsiloxy or other dialkylsiloxy, e. g. diethylsiloxy, units may result from using, e. g., diphenyldichlorosilane or diethyldichlorosilane with the dimethyldichlorosilane during the hydrolysis thereof. Such modified solid, elastic products are more particularly disclosed in the pending application of Murray M. Sprung, Serial No. 722,457 and in the pending application of Sprung and Burkhard, Serial No. 722,459, both filed January 16, 1947, now Patent No. 2,448,556 and assigned to the same assignee as the present invention.

The heat-curable, solid, elastic methylpolysiloxane, together with any fillers, pigments, etc., are compounded in the usual manner with the addition of the required amount of zirconyl nitrate employing compounding procedures well known in the rubber art. The zirconyl nitrate may be added at any time during the processing of the solid, elastic product providing a thorough distribution of the zirconyl nitrate throughout the aforesaid elastic product is obtained prior to molding or extruding. For instance, the curable, elastic material, the zirconyl nitrate, fillers, etc., may be mixed together in an ordinary dough mixer at room or slightly elevated temperatures. After the ingredients are thoroughly mixed, the contents of the dough mixer are transferred to rubber rolls for further working at room or elevated temperatures. If desired, the preliminary step in the dough mixer may be omitted and all the mixing done on the milling rolls.

If elevated mixing temperatures accelerate the cure, the temperature of the rolls should be regulated so as to insure a thorough mixing of the ingredients before the cure has progressed to a point where the mass cannot be satisfactorily molded or extruded. However, the heat sensitivity of the uncured material employing the zirconyl nitrate as a cure accelerator is apparently less than the heat sensitivity of the same material employing benzoyl peroxide for the purpose. Although this permits less critical compounding conditions, it also requires a slightly longer molding time than is necessary with the benzoyl peroxide.

After a homogeneous dispersion of the modifying ingredients and vulcanizing agent in the solid, elastic methylpolysiloxane is obtained, the compounded material may then be molded at varying temperatures and pressures depending, for example, on the type of molding employed, the filler used, thickness of object being molded, etc. Usually I may employ from about 10 to 45 minutes at 150° C. Although longer or shorter periods of time may be employed, nevertheless, it has been found satisfactory to remove the preliminarily cured, solid, elastic product from the mold and heat-treat it in an oven at temperatures of the order of about 200° C. for varying lengths of time to complete the cure.

In order that those skilled in the art may better understand how the present invention may be practiced, the following examples are given by way of illustration and not by way of limitation. All parts are by weight.

The solid, elastic, curable methylpolysiloxane employed in the examples was prepared as follows:

A liquid methylpolysiloxane consisting of methyl radicals and silicon and oxygen atoms and containing approximately 1.998 methyl groups per silicon atom (the said liquid methylpolysiloxane having been obtained by hydrolyzing di- methyldichlorosilane containing 0.2 mol per cent methyltrichlorosilane) was mixed with 0.5 per cent, by weight, ferric chloride hexahydrate and the mixture heated at about 100° to 125° C. for about one hour until a very thick viscous, bordering on a rubbery product, was obtained. The heated product was then poured into an open container where it solidified on cooling to yield the solid, elastic, curable methylpolysiloxane employed in the following examples.

EXAMPLE 1

The solid, elastic methylpolysiloxane (100 parts) prepared above was thoroughly mixed on rubber compounding rolls with 200 parts titanium dioxide and 2 parts zirconyl nitrate $$[ZrO_2(NO_3)_2.3H_2O]$$

until a homogeneous product was obtained. For comparison a similar formulation was prepared with the exception that 2 parts benzoyl peroxide was substituted for the zirconyl nitrate. The two compounded materials were molded in the form of flat slabs at about 500 p. s. i. for about 15 minutes at 150° C. A sample of each of the molded products was heat-aged in an oven at 200° C. to give the following results with regard to the weight loss of the samples:

Catalyst

| Zirconyl Nitrate | | Benzoyl Peroxide | |
|---|---|---|---|
| Time, Hours | Weight Loss, Per Cent | Time, Hours | Weight Loss, Per Cent |
| 225 | 3.3 | 225 | 5.8 |
| 700 | 4.1 | 630 | 7.5 |
| 1,125 | 4.5 | 990 | 8.8 |
| 1,625 | 4.8 | 1,500 | 9.6 |
| 3,200 | less than 7 | | |

At the end of about 1600 hours of heat-aging at 200° C., the solid, elastic product containing the zirconyl nitrate was satisfactorily flexible and showed no evidence of cracks even when bent or creased on itself. In contrast to this, the benzoyl peroxide-vulcanized material was less flexible and when folded over and creased upon itself showed evidence of cracking. The tensile strength and elongation of the elastic product using the zirconyl nitrate was better than the one vulcanized with benzoyl peroxide.

EXAMPLE 2

When celite was employed as a filler in place of titanium dioxide used in Example 1, at the end of 1600 hours at 200° C., the weight loss of such a heat-cured material was about half of the weight loss encountered when benzoyl peroxide was employed as the cure accelerator, all other conditions of formulation, preparation and testing being equivalent. In addition, the flexibility of the celite filled compositions of matter was much greater after the heat-aging when the zirconyl nitrate was employed.

It will be apparent to those skilled in the art that other inorganic fillers may be employed in place of those used in the foregoing examples. These include, for instance, lithopone, talc, silica, etc. The filler is preferably present in an amount equal to from 10 to 90 per cent, by weight, of the total weight of the filler and the solid, elastic methylpolysiloxane, depending upon the particular application required. I do not intend to be restricted to any particular filler nor any proportion of filler in the practice of this invention.

Other fillers, as well as smaller or larger amounts of filler, may also be used.

The cured, solid, elastic methylpolysiloxanes (elastomers) prepared and vulcanized in accordance with my invention are capable of withstanding elevated temperatures (150° to 250° C.) for extended periods of time and also retain their desirable rubbery characteristics at temperatures as low as −60° C.

Because of the low weight losses experienced using a zirconyl nitrate as a vulcanizing agent with a resultant decrease in shrinkage, and because it is possible to maintain the flexibility of the cured product at elevated temperatures for such long periods of time, my claimed compositions of matter are eminently suited for the insulation of armature coils by molding the material over glass-wound, resin-impregnated conductors. The claimed compositions of matter may also be used as gasket materials, shock absorbers, and for other applications for which known natural and synthetic rubbers have been used where it is desired to take advantage of the high temperature resistance and low temperature flexibility of the claimed solid, elastic methylpolysiloxanes.

What I claim as new and desire to secure by Letters Patent of the United States is:

1. A composition of matter comprising a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, having incorporated therein an amount of a zirconyl nitrate sufficient to effect curing of the elastic product.

2. A composition of matter comprising (1) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane and (2) from 0.1 to 6 per cent, by weight, of a zirconyl nitrate.

3. A heat-curable composition comprising (1) a filler, (2) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, and (3) a zirconyl nitrate in an amount equal to from 0.1 to 6 per cent, by weight, based on the weight of (2).

4. A composition of matter comprising the cured composition of claim 3.

5. A solid, elastic composition capable of being cured in a closed mold, said composition comprising (1) an inorganic filler, (2) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, and (3) from 0.5 to 4 per cent, by weight, of a zirconyl nitrate, based on the weight of (2).

6. A moldable composition comprising a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, having incorporated therein from 0.5 to 4 per cent, by weight, thereof of a zirconyl nitrate.

7. A product comprising the molded composition of claim 6.

8. A cured elastomer comprising the product obtained by heating a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, having incorporated therein from 0.1 to 6 per cent, by weight, thereof of zirconyl nitrate.

9. An elastomeric product comprising a heat-treated mixture of ingredients including (1) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, (2) a zirconyl nitrate corresponding to the formula $ZrO(NO_3)_2.3H_2O$ which is present in an amount corresponding to from 0.5 to 4 per cent, by weight, of the solid methylpolysiloxane of (1), and (3) a filler comprising titanium dioxide.

10. An elastomeric product comprising a heat-treated mixture of ingredients including (1) a solid, elastic, curable methylpolysiloxane consisting of methyl radicals and silicon and oxygen atoms and containing an average of from 1.98 to 2.00 methyl groups per silicon atom, said solid methylpolysiloxane having been obtained by condensing a liquid comprising essentially polymeric dimethylsiloxane containing up to 2 mol per cent copolymerized monomethylsiloxane, (2) a zirconyl nitrate in an amount corresponding to from 0.5 to 4 per cent, by weight, of the solid methylpolysiloxane of (1), and (3) a filler comprising celite.

JAMES G. E. WRIGHT.

No references cited.